United States Patent [19]

Aliesch et al.

[11] Patent Number: 4,724,752
[45] Date of Patent: Feb. 16, 1988

[54] MACHINE FOR THE AUTOMATIC PREPARATION OF A BEVERAGE

[75] Inventors: Robert Aliesch, Gibswil; Karl Germann, Blonay, both of Switzerland

[73] Assignee: Nestec S.A., Vevey, Switzerland

[21] Appl. No.: 839,883

[22] Filed: Mar. 14, 1986

[30] Foreign Application Priority Data

Apr. 30, 1985 [CH] Switzerland ............... 1828/85

[51] Int. Cl.⁴ .................................... A47J 31/00
[52] U.S. Cl. ........................... 99/289 R; 99/302 R
[58] Field of Search ............ 99/279, 289 R, 289 T, 99/289 D, 289 P, 295, 300, 302 R, 302 P; 426/433

[56] References Cited

U.S. PATENT DOCUMENTS 2,939,381  6/1960  McBride ................... 99/289 R
3,713,377  1/1973  Arnett ..................... 99/295
4,136,202  1/1979  Favre ...................... 426/77
4,602,558  7/1986  Kaper ..................... 99/289 R

FOREIGN PATENT DOCUMENTS 1185520  2/1959  France ................... 99/289 P

Primary Examiner—Robert W. Jenkins
Attorney, Agent, or Firm—Vogt & O'Donnell

[57] ABSTRACT

A machine, for the automatic preparation of a beverage which is extracted from a product contained in a cartridge, has at least one extraction mechanism and at least one assembly having a plurality of magazines for housing cartridges containing product to be extracted and for supplying those cartridges to a conveyor which supplies the cartridges from a magazine to a distributor which then supplies the cartridges to the extraction mechanism and which also removes cartridges from the extraction mechanism for discarding the used cartridge.

12 Claims, 4 Drawing Figures

MACHINE FOR THE AUTOMATIC PREPARATION OF A BEVERAGE

This invention relates to a machine for the automatic preparation of a beverage from a cartridge containing the product to be extracted, comprising a pump for delivering a liquid, a system for heating said liquid and an extraction mechanism.

So-called "espresso" machines in which coffee is extracted by a system injecting hot water under pressure into a heaped bed of coffee have been known and used for some time, particularly in restaurants and bars. These machines necessitate various tasks on the part of the person concerned, namely: choosing the type of coffee, checking the coffee used for uniformity of grind, dosing the coffee and forming a heaped layer of coffee in uniform manner so that extraction is as even as possible.

This care in the preparation, particularly in the dosing of the coffee, is essential for obtaining a beverage of good quality. However, it is not possible with a machine of the type in question to rule out irregularities in the quality of the coffee served. In addition, after each serving of coffee, the layer of extracted coffee has to be emptied, the capsule washed and then refilled and the layer of coffee heaped before the whole is set up for the injection of hot water therein for the preparation of another serving of coffee. Finally, it may also be said that it is not possible with a machine of the type in question to imagine customers serving themselves. Accordingly, machines of the "espresso" type have a number of disadvantages which the machine according to the invention seeks to remedy.

To this end, the present invention provides a machine which, by virtue of a system of sealed cartridges already containing doses of high-quality coffee, is self-contained in regard to type of coffee, grind, dose and formation of the layer of coffee, which requires hardly any intervention on the part of the user and which the customer may, if desired, use himself.

The present invention relates to a machine for the automatic preparation of a beverage from a cartridge containing the product to be extracted, comprising a pump for delivering a liquid, a system for heating said liquid and an extraction mechanism, characterized in that it comprises:

at least one assembly of slide magazines for housing the cartridges to be extracted, said cartridges being freely displaceable in said magazines;

at least one conveyor belt arranged beneath a magazine so as to advance the cartridge selected in order to position it; and at least one distiributor co-operating with and arranged in front of said magazine and said conveyor belt and consisting of a wheel with three recesses corresponding to the three positions of the cartridge to be extracted, namely its positioning, its extraction and its ejection, said cartridge co-operating in its second position with the extraction mechanism to deliver the beverage into a receptacle arranged underneath.

The cartridges used are, for example, those according to CH-PS No. 605 293, although it is possible to use others, if necessary adapting the affected parts of the machine. The function of the conveyor belt is to position correctly the cartridge to be extracted from the slide magazine to the distributor. The slide magazines are not critical and may be of any known type. They are preferably horizontal and are vertically displaceable by means of an endless chain system. The conveyor belt preferably advances horizontally and is arranged below the lowermost magazine of the assembly of magazines. The distributor bringing the cartridges from the positioning station to the extraction and ejection positions rotates about a vertical shaft.

The pump delivers water, of which the volume is preadjustable according to the volume of the cups used or according to the strength of the coffee which it is desired to obtain by way of a flexible pipe in the heating system. This system is integral with the extraction mechanism and is vertically displaceable by a piston and cylinder. A flowmeter arranged between the pump and the heating system enables the volume of water to be pre-adjusted.

The heating system is a continuous heating system in which the temperature of the liquid to be heated may be preadjusted.

The assembly of magazines comprises a plurality of cartridges to be extracted. When the magazines are empty, they are loaded through a loading window provided in the upper part of the machine.

When the type of coffee required is selected, the magazine assembly moves vertically until that magazine from which it is desired to remove the cartridge is in the bottom position. To ensure that this magazine is correctly positioned, a positioning wheel is provided on each magazine, engaging in a corresponding recess in a spring-mounted positioning cam integral with the conveyor belt. It is only when the lower magazine is correctly positioned that the conveyor belt begins to move.

The machine according to the invention may comprise a single magazine assembly. However, for use in restaurants and the like, from two to six magazine assemblies are preferably provided along with the corresponding number of conveyor belts and distributors co-operating with said magazine assemblies. The invention thus provides a high-performance machine which makes very uniform coffee of high quality. Since the machine according to the invention is of modular design, the number of magazine assemblies is not critical.

The invention is described in more detail in the following with reference to the accompanying drawings.

DETAILED DESCRIPTION OF THE INVENTION

Figure 1:
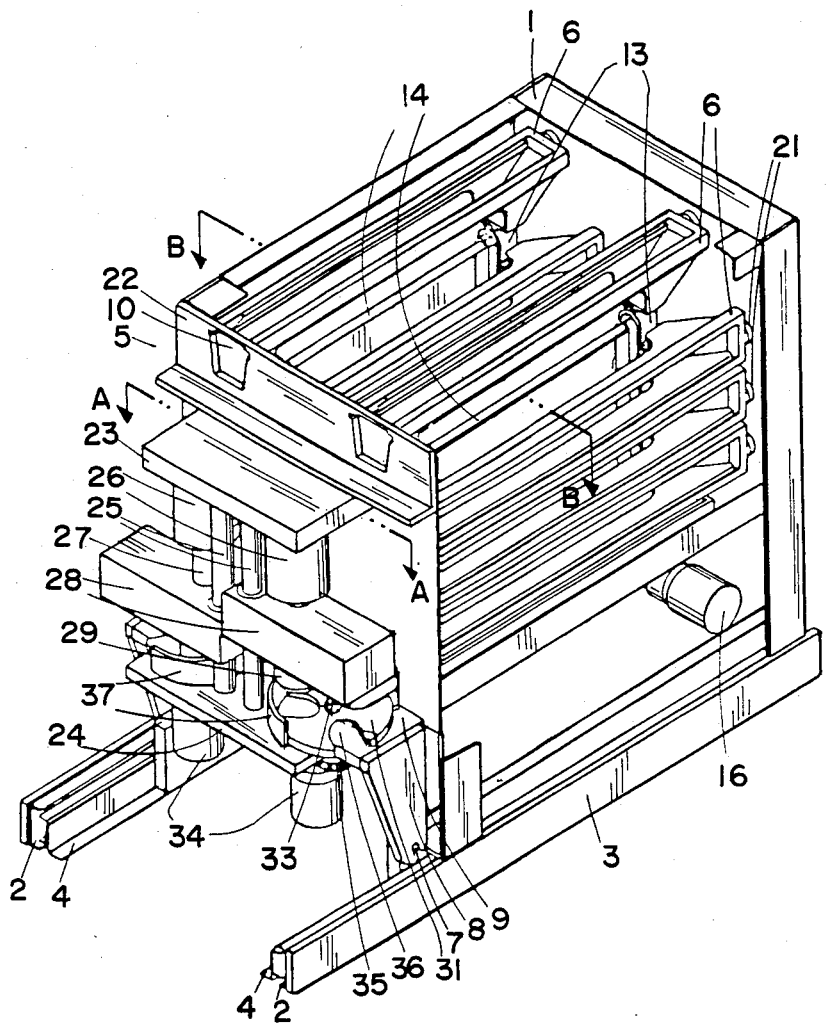
FIG. 1 is a perspective view of one embodiment of the machine according to the invention comprising two magazine assemblies.

The machine is mounted in a frame (1) mounted on rails (2) integral with a support (3). The frame (1) slides on its own rails (4). The machine in its frame comprises a front part (5) and a part comprising the two magazine assemblies (6). The machine as a whole is designed to slide for practical reasons during maintenance work. The front part (5) is also designed for removal and replacement, for which purpose it is made to pivot about the shaft (7). To this end, the part (8) which is integral with the plate (9) comprises a recess for engaging on said shaft (7).

Figure 3:
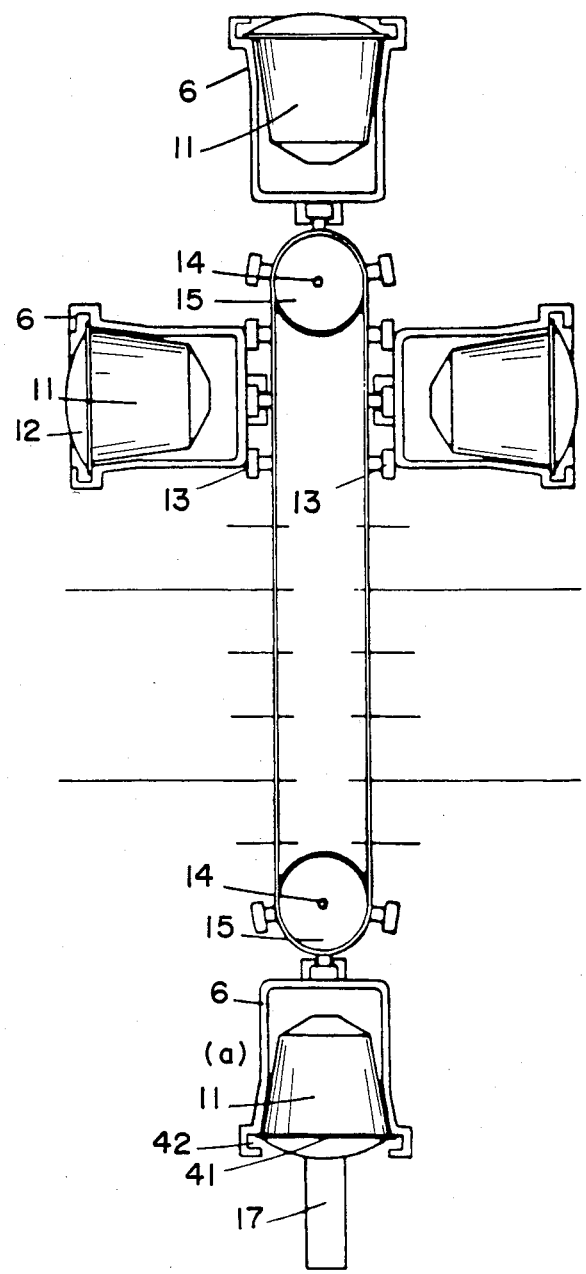
FIG. 3 is a section on the line B—B through the left-hand half of the machine shown in FIG. 1.

In the embodiment shown in FIG. 1, the machine comprises eight slide magazines (6) in each slide assembly (FIG. 3). The cartridges (11) to be extracted are loaded through the windows (10) in the front part. These cartridges are, for example, cartridges corresponding to CH-PS No. 605 293 although other cartridges may of course also be used, in which case it is merely necessary to provide the appropriate magazine. According to FIG. 1, each magazine may receive ten cartridges. Accordingly, it it possible to load eighty cartridges per magazine assembly and one hundred and sixty cartridges in all.

The magazine assembly (6) is integral with an endless chain (13) at the front, i.e., directly behind the front part (5), and with an identical chain at the rear. The two chains (13) are connected by two shafts (14). The chains are moved vertically by a motor (not shown) and turn about wheels (15) (FIG. 3). The rear part of the machine further comprises the pump (16) for delivering the water to the front part and a conveyor belt (17) for advancing and positioning the cartridge to be extracted. This conveyor belt is mounted (FIG. 4) on two pulleys (18) which are integral through a rod (19) with a positioning cam (20) of which the function will be explained hereinafter. Each magazine additionally comprises on its rear part a wheel (21) for correct positioning which in operation engages in a corresponding recess in the above-mentioned cam (20).

The front part (5) comprises a vertical panel (22) carrying plates (23) and (24) between which are mounted guides (25) themselves carrying a cylinder (26) and a piston (27) for the displacement of the heating system (28) and the extraction mechanism (29). The guide (25) also comprises a spring (30) which the heating system strikes during its descent.

The distributor (31) is integral with the plate (24) to which it is fixed by a bolt (33). It rotates about a shaft (32) under the power of a motor (34) and a gearwheel system (35) and comprises three recesses (36) in which the cartridges (11) to be extracted are housed. A guide (37) is also provided to prevent the cartridge to be extracted from slipping out during rotation of the distributor (31).

Figure 2:
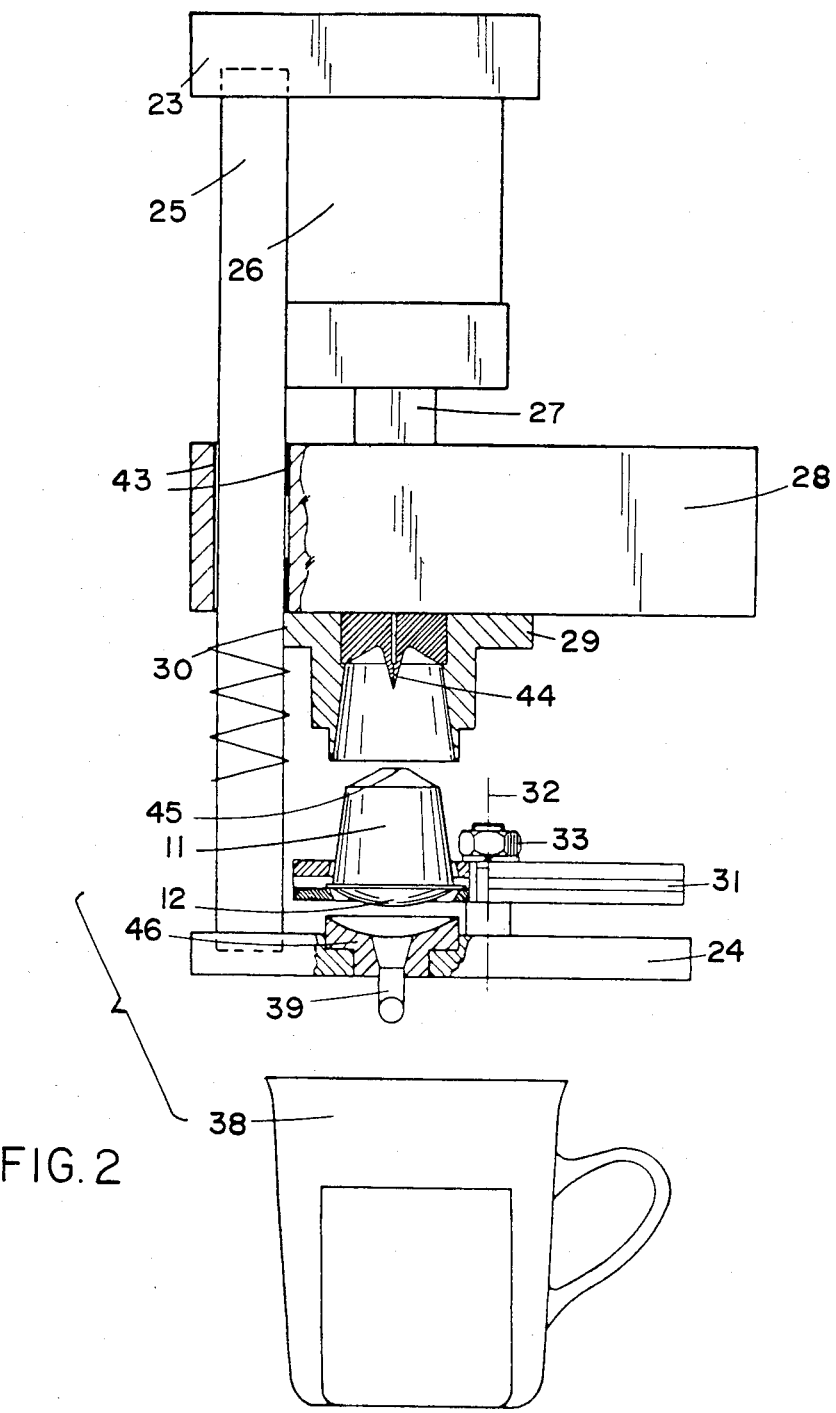
FIG. 2 is a section on the line A—A through the right-hand half of the machine shown in FIG. 1.

For reasons of simplification, the interior of the heating system (28) is not shown in FIG. 2. As already mentioned, the heating system is an instant heating system with which it is possible to pre-adjust the temperature of the water to be received in the cup (38). Finally, the plate (24) comprises a pipe (39) for receiving the prepared beverage.

Figure 4:
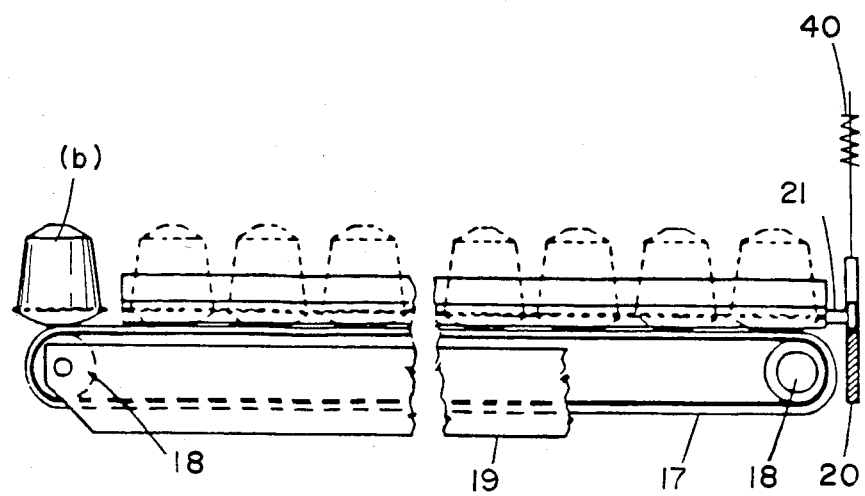
FIG. 4 diagrammatically illustrates the conveyor belt for positioning the cartridge to be extracted.

The components of the machine according to the invention having been described, their operation from the selection of the beverage to be prepared to its arrival in the receptacle (38) will now be explained. Since the machine comprises a plurality of magazines (6), various types of coffee may be loaded in said magazines, thus providing a choice of coffees. The magazines (6) having been loaded with cartridges, the type of beverage required is selected. The chains (13) driven by their motor displace the magazines (6) vertically until the magazine containing the required coffee is in the bottom position (a) (FIG. 3). This magazine (6) is positioned correctly by means of the wheel (21) which engages in the recess provided for this purpose in the positioning cam (20). The cam (20) is mounted on springs (40) (FIG. 4). When the wheel (21) is positioned correctly, the conveyor belt (17) integral with the cam (20) is applied by the spring (40) against the cartridges (11) in the magazine over the entire length thereof. The edges (41) (FIG. 3) of the cartridges are pushed upwards into the U-shaped recesses (42). These recesses (42) form the slide of the magazine and the cartridge retaining system. The conveyor belt then begins to move, bringing the cartridge (b) (FIG. 4) into the corresponding recess (36) of the distributor (31). Having positioned the cartridge, the conveyor belt (17) is stopped by a photocell and a signal is transmitted to the motor (34) to turn the distributor (31) to the extraction position of the cartridge.

The description of the extraction process is given with reference to FIG. 2. The cylinder (26) actuates the piston (27) which moves the heating system (28) and the extraction mechanism (29) downwards. The left-hand side of FIG. 1 shows the machine in the extraction position. The heating system (28) slides on the guide (25) via bushings (43). The heating system (28) is fed with water by a flexible pipe (not shown) from behind the vertical panel (22). The hot water, of which the volume is pre-adjusted by a flowmeter (not shown), arrives through an injector (44) which pierces the frustoconical tip (45) of the cartridge. The extraction mechanism (29) has an interior shaped to correspond with the exterior of the cartridge (11) to be extracted. When the injector (44) has pierced the cartridge, the water is injected therein under pressure. The pressure may be relatively high, reaching ca. 16 bars. As mentioned in CH-PS No. 605 293, the primary function of this pressure is to expand the membrane (12) and ultimately break it along its weakness line. The cover is thus completely opened so that the beverage is able to flow out into the receptacle (38) through the pipe (39). During extraction, the face (46) of the plate (24) substantially follows the shape of the membrane (45) of the cartridge (11) to be extracted. When the heating system has heated the pre-adjusted volume of liquid and allowed it to flow through the cartridge, the spring (30) of the guide (25) urges the assembly back in the upward direction. The motor (34) moves the distributor (31) into the ejection position of the cartridge which drops into a refuse bin.

The automatic coffee machine is ready for another selection of coffee. The cartridge to be extracted may be of another type than that above-mentioned. It is merely necessary in that case to change the extraction head (29) and, if required, to adapt the cartridge magazine (6). With the machine shown in FIG. 1, it is of course possible to prepare two cups of coffee at the same time. The machine according to the invention may also be provided with means for visualizing the absence of cartridges in a magazine or even for numerically indicating how many cartridges are left in the magazine where a cartridge is in the process of positioning.

The description has been given with coffee as an example. It is also possible with the machine according to the invention to prepare beverages from coffee/chicory blends and other substitutes or with chicory alone.

It is also possible to provide means for following the consumption of cartridges per day or per month.

We claim:

1. A machine for the automatic preparation of a comprising:
   at least one extraction mechanism;
   a distributor associated with each extraction mechanism for first receiving a cartridge containing product to be extracted, for then positioning that cartridge with regard to the extraction mechanism for extraction by a heated liquid and for, after extraction, removing the cartridge from the extraction mechanism for discarding the cartridge;

a plurality of movable magazines, associated with each distributor for housing the cartridges containing product to be extracted to be received by the associated distributor;

a conveyor associated with each plurality of movable magazines and with each distributor for contacting, slidably advancing and conveying a cartridge containing product to be extracted from a magazine of the plurality of movable magazines to the associated distributor for positioning the cartridge for extraction.

2. A machine according to claim 1 wherein the magazines of each plurality are arranged parallel and horziontal and are vertically displaceable in an endless manner about two vertically displaced axes, the conveyor is horizontally arranged and positioned parallel with the magazines and at a position below a lowermost displaced magazine, and the distributor is a wheel horizontally positioned and is capable of rotating about its axis.

3. A machine according to claim 2 wherein the wheel has three recesses, one recess corresponding to a position to receive a cartridge from the conveyor, a second recess corresponding to a position for extraction by the extraction mechanism and a third recess corresponding to a position for discarding an extracted cartridge.

4. A machine according to claim 2 further comprising a loading window corresponding with a position of a highermost displaced magazine.

5. A machine according to claim 1 or 2 wherein each extraction mechanism is vertically displaceable.

6. A machine according to claim 5 wherein the extraction mechanism has an interior which is shaped to substantially correspond with the exterior shape of the cartridge.

7. A machine according to claim 6 wherein the extraction is performed under pressure.

8. A machine according to claim 1 or 2 wherein the extraction mechanism has an interior which is shaped to substantially correspond with the exterior shape of the cartridge.

9. A machine according to claim 8 wherein the extraction is performed under pressure.

10. A machine according to claim 1 or 2 wherein a positioning cam which has a recess is associated with the distributor and the conveyor and wherein each magazine has a positioning wheel, whereby the positioning wheel of a magazine from which a cartridge is removed fits in the cam recess during removal of cartridges from the magazine.

11. A machine according to claim 1 further comprising a heating system, in which temperature of a liquid may be adjusted, to supply the heated liquid to the extraction mechanism.

12. A machine according to claim 1 or 2 wherein there are at least two units each comprised of an extraction mechanism, a distributor, a conveyor and a plurality of magazines.

* * * * *

UNITED STATES PATENT AND TRADEMARK OFFICE
CERTIFICATE OF CORRECTION

PATENT NO. : 4,724,752
DATED : February 16, 1988
INVENTOR(S) : Robert Aliesch et al.

It is certified that error appears in the above-identified patent and that said Letters Patent is hereby corrected as shown below:

In the preamble of claim 1 at column 4, lines 63-64 [lines 1-2 of claim 1], after "a" and before "comprising" insert --beverage by extraction of products contained in cartridges--.

Column 5, line 5 [line 11 of claim 1], delete the comma after "magazines".

Signed and Sealed this

Second Day of August, 1988

Attest:

DONALD J. QUIGG

*Attesting Officer*  *Commissioner of Patents and Trademarks*